(12) United States Patent
Sloop

(10) Patent No.: US 10,333,183 B2
(45) Date of Patent: Jun. 25, 2019

(54) RELITHIATION IN OXIDIZING CONDITIONS

(71) Applicant: Hulico LLC, Bend, OR (US)

(72) Inventor: Steven E. Sloop, Bend, OR (US)

(73) Assignee: Hulico LLC, Bend, OR (US)

( * ) Notice: Subject to any disclaimer, the term of this patent is extended or adjusted under 35 U.S.C. 154(b) by 121 days.

(21) Appl. No.: 15/402,206

(22) Filed: Jan. 9, 2017

(65) Prior Publication Data

US 2017/0200989 A1 Jul. 13, 2017

Related U.S. Application Data

(60) Provisional application No. 62/276,183, filed on Jan. 7, 2016.

(51) Int. Cl.
| | |
|---|---|
| *H01M 4/58* | (2010.01) |
| *C01G 53/00* | (2006.01) |
| *H01M 10/54* | (2006.01) |
| *H01M 4/131* | (2010.01) |
| *H01M 4/136* | (2010.01) |
| *H01M 4/485* | (2010.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ............ *H01M 10/54* (2013.01); *C01G 53/42* (2013.01); *C01G 53/44* (2013.01); *C01G 53/50* (2013.01); *H01M 4/131* (2013.01); *H01M 4/136* (2013.01); *H01M 4/485* (2013.01); *H01M 4/505* (2013.01); *H01M 4/525* (2013.01); *H01M 4/5825* (2013.01); *H01M 10/0525* (2013.01); *C01P 2006/40* (2013.01); *H01M 2004/028* (2013.01); *Y02W 30/84* (2015.05)

(58) Field of Classification Search
CPC ...................................................... C01G 53/42
See application file for complete search history.

(56) References Cited

U.S. PATENT DOCUMENTS

| | | | | |
|---|---|---|---|---|
| 6,150,050 A | * | 11/2000 | Mathew ................ | H01M 10/54 423/179.5 |
| 8,882,007 B1 | * | 11/2014 | Smith ................... | H01M 10/54 241/21 |

(Continued)

FOREIGN PATENT DOCUMENTS

| | | | | |
|---|---|---|---|---|
| JP | 09320588 A | * | 12/1997 | ............. C01G 51/42 |
| JP | H09320588 A | | 12/1997 | |

(Continued)

OTHER PUBLICATIONS

ISA Korean Intellectual Property Office, International Search Report and Written Opinion Issued in PCT Application No. PCT/US2017/012776, dated Sep. 29, 2017, WIPO, 16 pages.

*Primary Examiner* — Melissa S Swain

(74) *Attorney, Agent, or Firm* — Alleman Hall Creasman & Tuttle LLP

(57) ABSTRACT

Examples are disclosed of methods to recycle positive-electrode material of a lithium-ion battery. One example provides a method including relithiating the positive-electrode material in a solution comprising lithium ions and an oxidizing agent, and after relithiating, separating the positive-electrode material from the solution.

20 Claims, 9 Drawing Sheets

(56) References Cited

U.S. PATENT DOCUMENTS

| | | | |
|---|---|---|---|
| 9,614,261 B2 | 4/2017 | Kepler et al. | |
| 2003/0186110 A1* | 10/2003 | Sloop | H01G 9/038 |
| | | | 429/49 |
| 2009/0286137 A1* | 11/2009 | Sloop | H01M 2/36 |
| | | | 429/50 |
| 2010/0146761 A1* | 6/2010 | Sloop | H01M 6/52 |
| | | | 29/403.3 |
| 2010/0203366 A1* | 8/2010 | Sloop | H01M 4/485 |
| | | | 429/49 |
| 2014/0377597 A1* | 12/2014 | Sloop | H01M 10/052 |
| | | | 429/49 |
| 2016/0043450 A1* | 2/2016 | Sloop | C01G 53/50 |
| | | | 252/182.1 |

FOREIGN PATENT DOCUMENTS

| | | | | |
|---|---|---|---|---|
| WO | 2015077080 A1 | 5/2015 | | |
| WO | 2015128219 A1 | 9/2015 | | |
| WO | WO-2015128219 A1 * | 9/2015 | | H01M 4/0471 |

* cited by examiner

RELITHIATION IN OXIDIZING CONDITIONS

CROSS REFERENCE TO RELATED APPLICATION

The present application claims priority to U.S. provisional application No. 62/276,183 entitled RELITHIATION IN OXIDIZING CONDITIONS filed Jan. 7, 2016, the entire contents of which are hereby incorporated by reference in its entirety for all purposes.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of innovation research award 1448061 CT12 awarded by the National Science Foundation, and contract SP4701-15-C-0097 awarded by the Defense Logistics Agency.

TECHNICAL FIELD

The present application relates to the field of lithium-ion batteries, and more particularly, to recycling the positive-electrode material of a lithium-ion battery.

BACKGROUND

Lithium-ion batteries provide power to products ranging from automobiles to smart phones. These batteries are rechargeable over many cycles, tolerant to various environmental factors, and have a relatively long useful lifetime. Nevertheless, they eventually fail or are discarded prior to failure, and therefore contribute to a significant and growing waste stream. In view of this situation, environmental regulations, industry standards, and collection services have arisen to promote the recycling of lithium-ion batteries.

SUMMARY

Examples are disclosed of methods to recycle positive-electrode material of a lithium-ion battery. One example provides a method including relithiating the positive-electrode material in a solution comprising lithium ions and an oxidizing agent, and after relithiating, separating the positive-electrode material from the solution.

DETAILED DESCRIPTION

Spent lithium-ion positive-electrode materials may have depleted levels of lithium relative to new materials. Recycling processes for spent lithium-ion positive-electrode materials thus may include relithiation of the spent positive-electrode material. Relithiation may be performed in various manners. For example, relithiation may be performed via hydrothermal treatment of the spent positive-electrode material in an aqueous lithium ion solution, such as a lithium hydroxide solution. The hydrothermally reacted spent electrode material then may be removed from the solution, and sintered to form a recycled electrode material. Examples of such a recycling processes are disclosed in U.S. application Ser. No. 14/820,504 entitled RECYCLING POSITIVE-ELECTRODE MATERIAL OF A LITHIUM-ION BATTERY filed Aug. 6, 2015, the entire contents of which are hereby incorporated by reference. Various example relithiation techniques are also described in U.S. Pat. No. 8,846,225, titled REINTRODUCTION OF LITHIUM INTO RECYCLED BATTERY MATERIALS, the entire contents of which are also incorporated by reference.

However, efficiency of recovery may depend on the type of electrode material being recycled. For example, and without wishing to be bound by theory, during hydrothermal treatment of a nickel-containing positive-electrode material such as a lithium-nickel-cobalt-aluminum (herein referred to as NCA) or lithium-nickel-manganese-cobalt material (NMC), the material may be more sensitive to reducing factors in the environment. As such, nickel may be reduced to a +2 oxidation state, which may impact electrode performance, and lend itself to dissolution from the electrode. Other transition metals may be similarly affected.

Accordingly, examples are disclosed herein that relate to the inclusion of one or more an oxidizing agents in a lithium solution during a hydrothermal relithiation treatment. It will be understood that the term "hydrothermal treatment" and the like as used herein may refer to processes that utilize aqueous or non-aqueous solvent-based relithiating solutions at elevated pressure and temperature. Incorporating an oxidizing agent in the hydrothermal treatment step may help to avoid the reduction of metal ions in a positive electrode material (such as an NCA material) by reducing agents, such as carbon, residual electrolyte, binder or other reducing conditions that may be present. Further, the use of an oxidizing agent during hydrothermal treatment may help to avoid subsequent sintering steps in the recycling process, which may help reduce operating costs and increase the speed of a recycling process relative to the use of sintering. It will be understood that use of an oxidizing agent as disclosed herein may be incorporated in any other suitable recycling process involving a solvent-based relithiation step, which may or may not include a hydrothermal treatment step.

Figure 1:
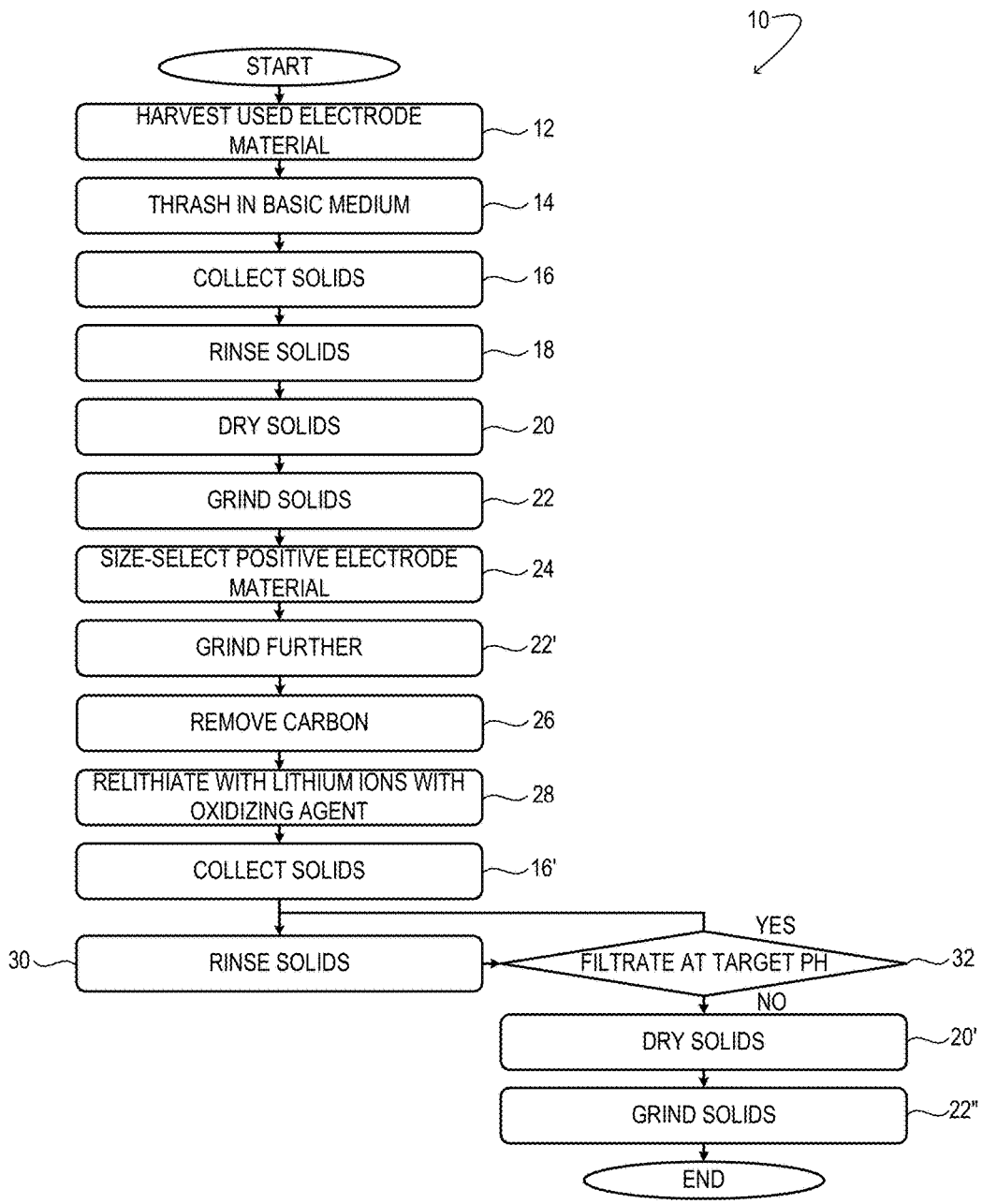
FIG. 1 illustrates an example method to recycle a lithium-ion battery in accordance with an embodiment of this disclosure.

FIG. 1 illustrates aspects of an example method 10 to recycle previously used positive-electrode material of a lithium-ion battery. The illustrated example is discussed in the context of NCA chemistry, where the positive electrode material includes lithium nickel cobalt aluminum oxide (e.g. $LiNi_{1-x-y}Co_xAl_yO_2$, for example $LiNi_{0.8}Co_{0.15}Al_{0.5}O_2$) as the electroactive material. Nevertheless, all aspects of the illustrated method are applicable to other positive-electrode chemistries as well. Examples of other positive-electrode materials include, but are not limited to, other materials in which nickel is in a +3 oxidation state, such as nickel manganese cobalt oxide: $LiNi_{1-x-y}Co_xM_yO_2$ (M=Al, Mn), (e.g. $Li[Ni(1/3)Co(1/3)Mn(1/3)]O2$, with a Ni:Co:Mn ratio of 1:1:1, as well as Ni:Co:Mn of other ratios). Further, the disclosed examples may be utilized with electrode materials that do not contain nickel. Examples include but are not limited to lithium cobalt oxide lithium iron phosphate, and lithium manganese oxide.

At 12 of method 10, a quantity of previously used positive-electrode material is harvested. The positive-electrode material may be harvested from any suitable source, such as a lithium-ion battery waste or recycling stream. In other embodiments, the positive-electrode material may be harvested from a generic waste or recycling stream. In some scenarios, the positive-electrode material may be harvested from batteries that have exceeded a recommended shelf life or recommended maximum number of recharge cycles.

The harvesting enacted at 12 may include disassembly of one or more lithium-ion batteries and removal of the positive-electrode material therein. Typically, a lithium-ion battery includes a housing that supports positive and negative exterior terminals and encloses the positive and negative electrodes and non-aqueous electrolyte solution. The positive exterior terminal may be connected via the housing to the positive electrode, while the negative exterior terminal may be connected through the housing to the negative electrode. Depending on the battery configuration, the housing may be breeched by cutting, drilling, and/or prying, to expose the positive- and negative-electrode materials and the electrolyte. In some embodiments, the housing may be breeched under an atmosphere of reduced oxygen and/or humidity. For example, the housing may be breeched under a blanket of nitrogen, argon, or carbon dioxide. Such measures may help to prevent the negative electrode material (which may include metallic lithium or lithium-intercalated carbon) from igniting or releasing an undesirable amount of heat. The term "harvest" may refer to the entirety of, or any sub-part, of the process in which positive-electrode material is removed from batteries and provided to a recycling process. Thus the term "harvest" and the like may include obtaining the positive-electrode material from another entity that performed the removal of positive-electrode materials from batteries.

Typically, the harvesting enacted at 12 will include removal of the housing and exterior terminals, the non-aqueous electrolyte, and the negative electrode. These components may be recycled separately, if desired. Removal of the housing, exterior terminals, non-aqueous electrolyte, and negative electrode leaves behind the positive electrode, which may include a positive-electrode material be supported on an aluminum or other metallic/conductive foil substrate. The positive-electrode material may also include a significant amount a polymeric binder (e.g., a fluoropolymer or styrene polybutadiene).

In one embodiment, the positive-electrode material may include NCA ($LiNi_xCo_yAl_zO_2$). In other examples, the positive-electrode material may include NMC $LiNi_xMn_yCo_zO_2$ with various ratios of Ni:Mn:Co, for example, 1:1:1; 5:3:2; 4:4:2; 6:2:2; 2:6:2). In yet other examples, the positive-electrode material may include lithium cobalt oxide ($LiCoO_2$, LCO), lithium manganese oxide ($LiMn_2O_4$, LMO), lithium nickel manganese cobalt oxide ($LiNi_xMn_yCo_zO_2$, NMC), lithium iron phosphate ($LiFePO_4$, LFP) or lithium titanate ($Li_4Ti_5O_{12}$). As mentioned above, in the forms typically recovered from waste or recycling streams, these compounds may be lithium-deficient. In other words, they may contain less than the stoichiometric number of lithium ions ($Li^+$) compared with the originally manufactured lithium metal oxide material. Accordingly, the recycling method described herein replenishes the lithium content of the recycled positive-electrode materials.

Continuing in FIG. 1, at 14 the supported positive-electrode material is mechanically thrashed in basic medium. This action mechanically separates (i.e., delaminates) the positive-electrode material from the support, partially separates the positive-electrode material and from the binder, and breaks each of these components down to a manageable particle size to facilitate subsequent mechanical and chemical processing (vide infra). Thrashing in a basic medium—as opposed to an acidic or neutral media—has been found to lessen the rate of decomposition of the positive-electrode material during the thrashing process for some electrode materials, such as various NMC based materials. In some embodiments, the basic medium may be a liquid medium in which the positive-electrode material is suspended—e.g., an aqueous or non-aqueous solution. In one embodiment, the positive-electrode material is suspended in ambient-temperature water basified with lithium hydroxide (LiOH) to a pH in the range of 11.0 to 11.5. This pH range is basic enough to retard acid hydrolysis of a positive-electrode material, but not so basic as to promote rapid oxidation of the aluminum foil support of the positive-electrode material, which could proliferate aluminum ions through the system. In other embodiments, different bases, solvents, and pH ranges may be used. In particular, the pH range may be adjusted based on the chemical identity of the positive-electrode material—e.g., a more basic pH range for more basic materials, and a less basic range for less basic materials. In one particular embodiment, the desirable pH for rinsing is the same as the pH that the suspended positive-electrode material imparts to deionized water. In some examples, an oxidizing agent, such as LiClO, hydrogen peroxide, lithium peroxide, or other suitable material, may be included in this solution.

Continuing in FIG. 1, as one non-limiting example, the thrashing of the suspended positive-electrode material may be conducted in a rotating-blade thrashing vessel, which loosely resembles a household blender, but may accommodate samples of one to ten liters. In a typical run, 0.5 to 2 kilograms of supported positive-electrode material are thrashed in one liter of basified water for 5 minutes. Naturally, other sample sizes and thrashing times are contemplated as well.

At 16 the various solids deriving from the supported positive-electrode material are collected from the thrashed slurry. The solids may be collected by gravity filtration, pressure filtration, vacuum filtration, and/or centrifugation, for example.

At 18 the collected solids may be rinsed with a liquid to remove the basic medium used in the thrashing, and to remove any electrolyte (salts and non-aqueous solvent) retained on the supported positive-electrode material prior to thrashing. The rinsing may be done in the filtration or centrifugation apparatus used for solids collection. In some embodiments, an organic solvent may be used for the rinsing. It is desirable that the chosen solvent be partially or fully miscible with water, so that the rinsing process also removes entrained water (from the basic thrashing medium) from the collected solids. It is also desirable that the solvent be recoverable from the rinsings, innocuous to workers and to the environment, and/or suitable for inexpensive disposal compliant with applicable laws. Acetone, ethanol, and some other alcohols are good candidates for the rinsing solvent due to their miscibility with water, relatively low toxicity, and ability to dissolve the solvents and salts of the non-aqueous electrolyte (e.g., lithium hexafluophosphate and its decomposition products such as LiF and various phosphates, lithium triflate, ethylene carbonate, diethyl carbonate, etc.). Acetone and ethanol are also potentially recoverable from the rinsings by distillation at reduced pressure.

Acetone has additional attractive properties as a rinse solvent because it is a good solvent for organics and a relatively poor solvent for LiOH. More specifically, various organic compounds—e.g., low molecular-weight polymers and fluoropolymers, plasticizers, etc.—may be present in the binder, which is used to adhere the positive-electrode material to the substrate. Washing with acetone dissolves or solublizes at least some of these components, allowing them to be rinsed away and excluded from subsequent processing. This increases the purity of the recycled positive-electrode material. In addition, the low solubility of LiOH in acetone is a benefit in embodiments where the thrashing is done in water basified with lithium hydroxide (LiOH). Here, a small amount of LiOH remains on the rinsed solids, which may act to suppress acid hydrolysis of the positive-electrode material during the recycling procedure.

In other embodiments, the collected solids may be rinsed in a different organic solvent, in an aqueous solution of having a suitable pH (e.g. an aqueous LiOH solution having a pH of 11.0-11.5). Supercritical carbon dioxide may also be used. Despite the advantages of the rinsing enacted at 18, this step is by no means essential, and may be omitted in some embodiments.

At 20 the rinsed solids are dried to remove sorbed water and residual rinse solvent. In the various embodiments here contemplated, the drying may be done in vacuuo, or under a stream of dehumidified (e.g., heated) air or other dry gas, such as nitrogen, argon, or carbon dioxide. In one embodiment, the rinsed solids are dried in a vacuum oven at 140° C.

At 22 the dried solids are mechanically ground. This grinding step may help to reduce the particle size of the positive-electrode material, to improve yield in subsequent sieving. In one non-limiting example, a ball mill may be used for the grinding. In a typical run, a 400-milliliter capacity ball mill is charged with 60 grams of dried solid and 30# agate spheres of 0.5 to 1 centimeter mixed diameter. The mill may be run for 3 to 5 minutes at 50 Hz, for example. It will be noted that the grinding enacted at 22 may undesirably reduce some of the aluminum substrate to a particle size comparable to that of the positive-electrode material, which may reduce the effectiveness of subsequent purification by size selection. Omitting or shortening the grinding step or modifying the ball-mill frequency may increase product purity, at the expense of yield.

At 24 the ground solids are subject to size selection using one or more fine sieves, in order to isolate the positive electrode material from pieces of substrate, binder, and steel filings that may be created by cutting the batteries apart during the harvesting step. In one embodiment, the positive-electrode material selected for further processing is the portion that passes through a 38 to 45 micron sieve, preferably a 38 micron sieve. This fraction, at 22', is subjected to a second grinding step to further reduce its particle size. Without wishing to be bound by theory, the second grinding step may increase the efficiency of subsequent hydrothermal treatment, to restore the stoichiometric lithium content of the recycled positive-electrode material. Other sequences of grinding and size exclusion are contemplated as well. In some embodiments, a fine filtration step conducted in basified liquid medium may be used in lieu of sieving.

At 26, an amount of carbon may be removed from the solids prior to hydrothermal treatment. For example, carbon may be removed by heating the solids at sufficient temperature to burn out the carbon. Removal of carbon also may be accomplished by density methods commonly employed in the mining industry through slurries or with liquids having an intermediate density between carbon, carbon graphite (2.2 grams/cc) and the lithium metal oxides (typically 3 grams/cc) Removal of carbon may help to prevent decomposition of the positive-electrode material during the hydrothermal treatment step. However, it is noted that practice of the disclosed example processes with carbon graphite present does not appear to impede relithiation of the positive electrode material. It will be understood that any other suitable method of removing carbon may be utilized, and the pre-removal of carbon is optional. At 28, the twice ground solids are relithiated, for example, via hydrothermal treatment in an autoclave with concentrated or supersaturated aqueous LiOH and an oxidizing agent. As another example, the positive-electrode material may be relithiated via a fluidized bed process, where the reactant solution of LiOH and the oxidizing agent is passed through the positive-electrode material residing in the fluidized bed. As yet another example, relithiation may be performed via a solid-state reaction using a lithium salt, e.g. LiOH, $Li_2O$, or $Li_2CO_3$. Relithiation may help to restore the stoichiometric lithium content of the positive electrode material, for example, by displacing any foreign cations (i.e. impurities) or misplaced cations (i.e. nickel ions that may migrate to lithium sites in a lattice) that may be present. In one embodiment of hydrothermal treatment, one liter of 24% LiOH may be used for each kilogram of positive-electrode material. It will be noted that this concentration of LiOH exceeds saturation at typical ambient temperatures. The contents of the autoclave may be ramped from ambient temperature of 250 to 275° C. at a rate of 5° C. per minute, and maintained at that temperature for 12 to 14 hours. Alternatively, heating to 250° C. and subsequent cooling to room temperature also has been found to be effective. Higher temperatures are found to reduce yield, potentially by promoting undesirable side reactions involving the residual binder. In other examples, any other suitable solution of lithium ions than a lithium hydroxide solution may be used in the relithiation step, and any other suitable processing conditions may be used.

As described above, the use of an oxidizing agent may help to avoid reduction of metal ions during the relithiation process. Without wishing to be bound by theory, various conditions that may be encountered in a hydrothermal or other relithiation process may tend to reduce metal ions in the positive-electrode material. For example, deoxygenation in NCA or NMC materials occur by the reaction $LiNiO_2 \rightarrow Li_{(1-x)}NiO_{(2-y)}+xLi^++yO_2^-$ (oxygen loss)$\rightarrow$NiO. Thus, incorporating an oxidizing agent may help to avoid such metal ion reduction. Addition of an oxidizing agent during relithiation (e.g. hydrothermal treatment) also may obviate the need for any oxidizing steps downstream, such as sintering under oxygen or other oxidizing atmosphere, thus simplifying the recycling process.

Any suitable oxidizing agent may be used in the relithiation solution. Examples include but are not limited to peroxides such as hydrogen peroxide, permanganates, chorine, hypochlorites, chlorates, perchlorates, percarbonates, perborates, iron, fluorine, sulfite, beryllium fluoride, boron fluoride, carbonate, nitrate, arsonate, phosphate, antimonite, tellurate, iodate, $TiCl_6$, $SnCl_6$, germanium fluoride, platinum hexchloride, chromate, molybdate, or any compound having an oxygen atom capable of accepting an extra electron. In some examples, hydrogen fluoride may be added along with the oxidizing agent, as fluorination may help to further stabilize the desired oxidation state(s) of the nickel. In some examples, it may be desirable to remove byproducts of oxidation. For example, $Fe^{3+}$ oxidizing agent may produce an $Fe^{2+}$ species that would not be desirable in the end product.

Additionally, in some examples, the relithiation solution may comprise dilute nickel. For example, hydrothermal relithiation solution may be reused between batches numerous times. It has been found that the hydrothermal relithiation solution comprises dissolved $Ni^{2+}$, and that the concentration of the dissolved nickel appears to remain at a relatively consistent concentration from batch to batch. Thus, having some dilute nickel in the hydrothermal solution, whether added prior to relithiation or retained from previous batches using the same solution, may help to retain nickel in the electrode material lattice.

At 16' the cooled, hydrothermally treated solids are collected, and at 30 the solids are rinsed to remove excess LiOH. Some materials may potentially be sensitive to the manner of rinsing at this stage of the process. For example, neutral-to-acidic conditions may impact the electrochemical properties of the positive-electrode material (e.g., capacity and current capability). Without wishing to be bound by theory, sensitivity to acid hydrolysis may be higher at this stage than earlier stages for some positive-electrode materials, because the binder has been mostly eliminated. Accordingly, the collected solids may be rinsed with water basified by LiOH to a pH in the same range as used in rinsing step 18—e.g., pH 11.0 to 13.5 for NCA. Alternatively, the collected solids may be rinsed with less basic or even deionized water, while, at 32, the pH of the filtrate is continuously monitored. Other suitable solvents for rinsing may include, but are not limited to, nonaqueous solvents such as liquid carbon dioxide, supercritical carbon dioxide, methanol, ethanol, isopropol alcohol, t-butanol, n-butanol, glycol, polyethelene glycol, bromoform, di-bromomethane, bromal, tetraboro-methane, bromine, di-bromoethane; solutions of ammonium metatungstate, sodium polytungstate, and potassium tetraiodomercurate(II), and/or solutions thereof. Rinsing is ended when the pH of the filtrate falls within the desired range. For a typical 500-gram batch of positive-electrode material, a total of 4 liters of wash water may be used, prior to the pH dropping into the target range. In another embodiment, 4 liters of aqueous LiOH within a desired pH range may be used.

At 20' the rinsed, hydrothermally treated solids may be dried in vacuuo at 150 to 160° C., and at 22', the solids may be ground for a third time to provide a particle size suitable for application on a new positive electrode support.

Figure 2:
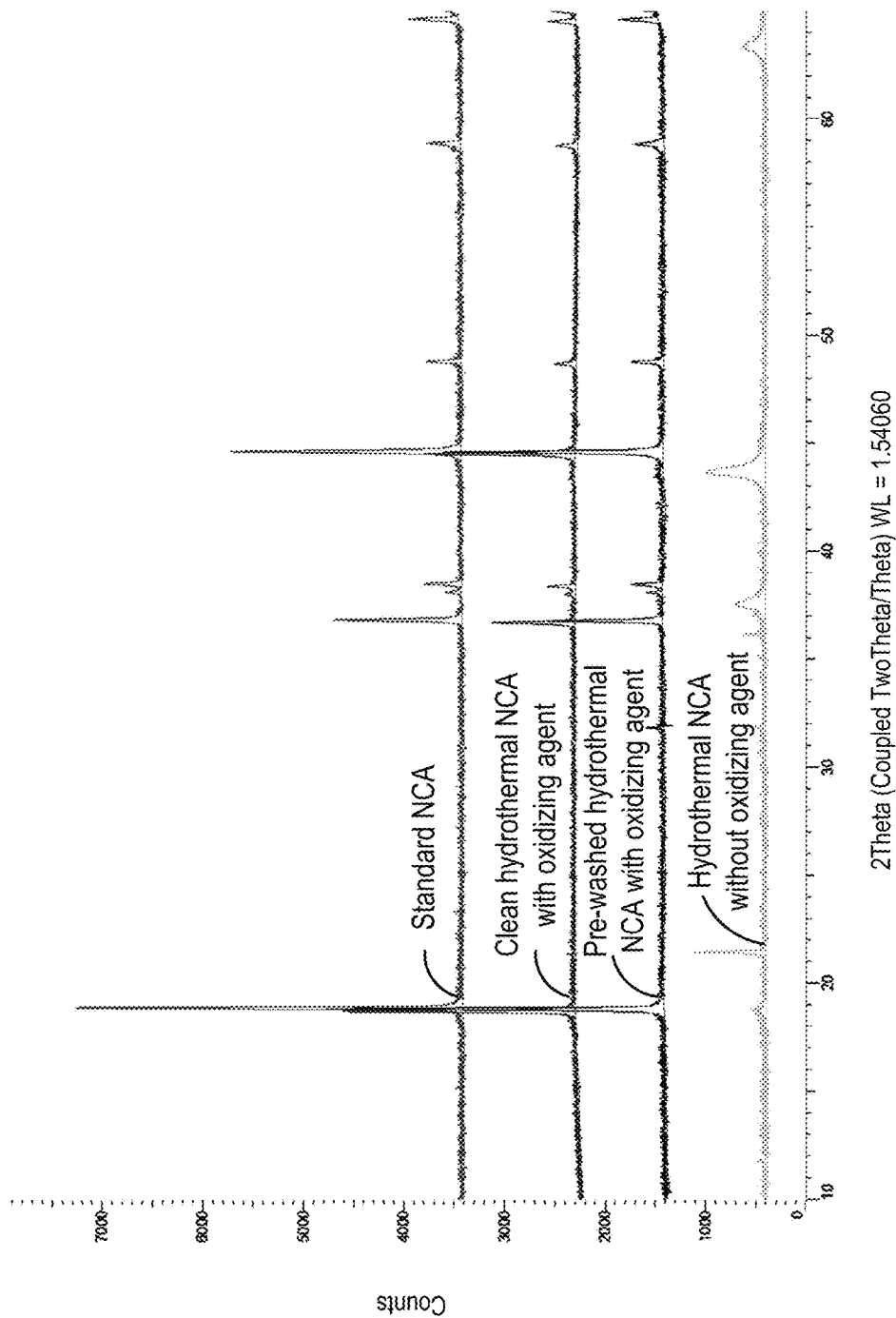
FIG. 2 shows a plot of X-ray powder diffraction patterns for example NCA electrode materials.

Experiments have revealed that NCA harvested from hydrothermal treatment without an oxidizing agent results in apparent decomposition of NCA during hydrothermal treatment, as the harvested powder product exhibits a brown color indicative of decomposition. FIG. 2 shows a plot of X-ray powder diffraction patterns for example NCA electrode materials including a standard untreated and undepleted NCA, a clean (i.e. rinsed) recycled NCA hydrothermally treated with an oxidizing agent, a pre-washed (i.e. pre-rinsed) recycled NCA hydrothermally treated with an oxidizing agent, and a recycled NCA that was hydrothermally treated without an oxidizing agent. The hydrothermal treatment was performed using 2 g NCA+75 mL total solution of 4M LiOH and 5 mL of 30% $H_2O_2$. The reaction was carried out at 250° C. in a stirred autoclave for 9 hours. The resulting product was removed from the reactor and collected in a centrifuge. Powder x-ray diffraction data from this sample is shown in FIG. 2 as "pre-washed hydrothermal NCA with oxidizing agent." The sample was then washed 3× with a dilute solution of LiOH (pH of 13.3) and centrifuged. The powder x-ray diffraction pattern for this sample is shown in FIG. 2 as "clean hydrothermal NCA with oxidizing agent." The NCA samples hydrothermally treated with an oxidizing agent produced black colored powder having little to no browning, indicating a more stable crystalline material without decomposition. In contrast, the recycled NCA hydrothermally treated under similar conditions but without an oxidizing agent shows entirely different diffraction peaks in the powder diffraction pattern, indicating that the material was converted to a different phase or phases than the form used as electrodes. The hydrothermal reactions without oxidizing agent produce lithium carbonate, and decompose the layered character of the NCA indicated by the loss of the (003) reflection at 19° two-theta. Oxidizing conditions conserve the layered, electrochemically active material and suppress the formation of lithium carbonate.

As mentioned above, the observed decomposition of NCA may be due to the sensitivity of the NCA material in a reducing environment, as the nickel in NCA is present in a +3 oxidation state. Such an oxidation state may be vulnerable to decomposition into 2+ and 4+ states, which may lead to instabilities, for example via the Jahn-Teller effect. $Ni^{2+}$ is soluble in solutions and organic solvents, which is evident in the presence of an apple green appearance of wash solutions and hydrothermal fluid. The use of dilute $Ni^{2+}$ (i.e. mg/mL, or reuse of previous hydrothermal bath fluid) in the hydrothermal bath mixture may have an impact on the electrochemical activity of the recycled product; however, the comparison is not complete. $Ni^{3+}$ and $Ni^{4+}$ moieties are not soluble in solution. Then, the oxidizing agent may help to maintain the nickel in a +3 oxidation state and avoid such defects, as well as other possible issues, such as phase separations due to the mixed oxidation states.

Figure 3:
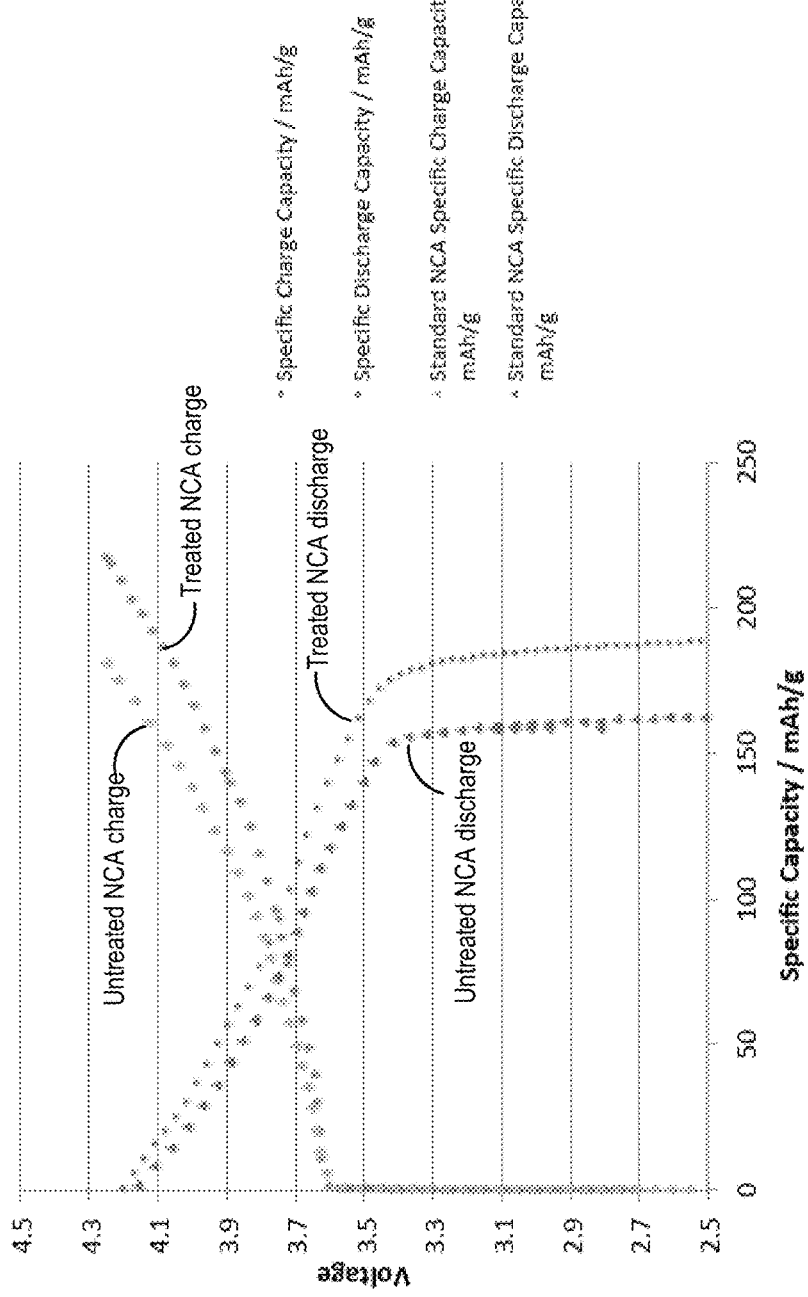
FIG. 3 shows a plot of specific capacity of first charge-discharge cycle for an example hydrothermally treated recycled NCA electrode material compared to an untreated NCA standard electrode material.

FIG. 3 shows a plot of specific capacity of the first charge-discharge cycle for an example oxidative hydrothermally treated NCA electrode material compared to an untreated NCA standard electrode material. The treated NCA electrode material was not recovered from a battery, but instead was an unused material subjected to hydrothermal treatment utilizing hydrogen peroxide as an oxidizing agent. The above described hydrothermal treatment process was used, and the black solid was dried under a vacuum at 125° C. and built into small button cells for electrochemical capacity evaluation. The plot shows that the baseline charge and discharge capacities of the untreated NCA standard electrode material are less than that of the treated material. Thus, treated NCA material exhibits increased capacity and higher voltage profile on discharge, indicating that the treated NCA material may have improved performance compared to the untreated standard NCA material.

Figure 4:
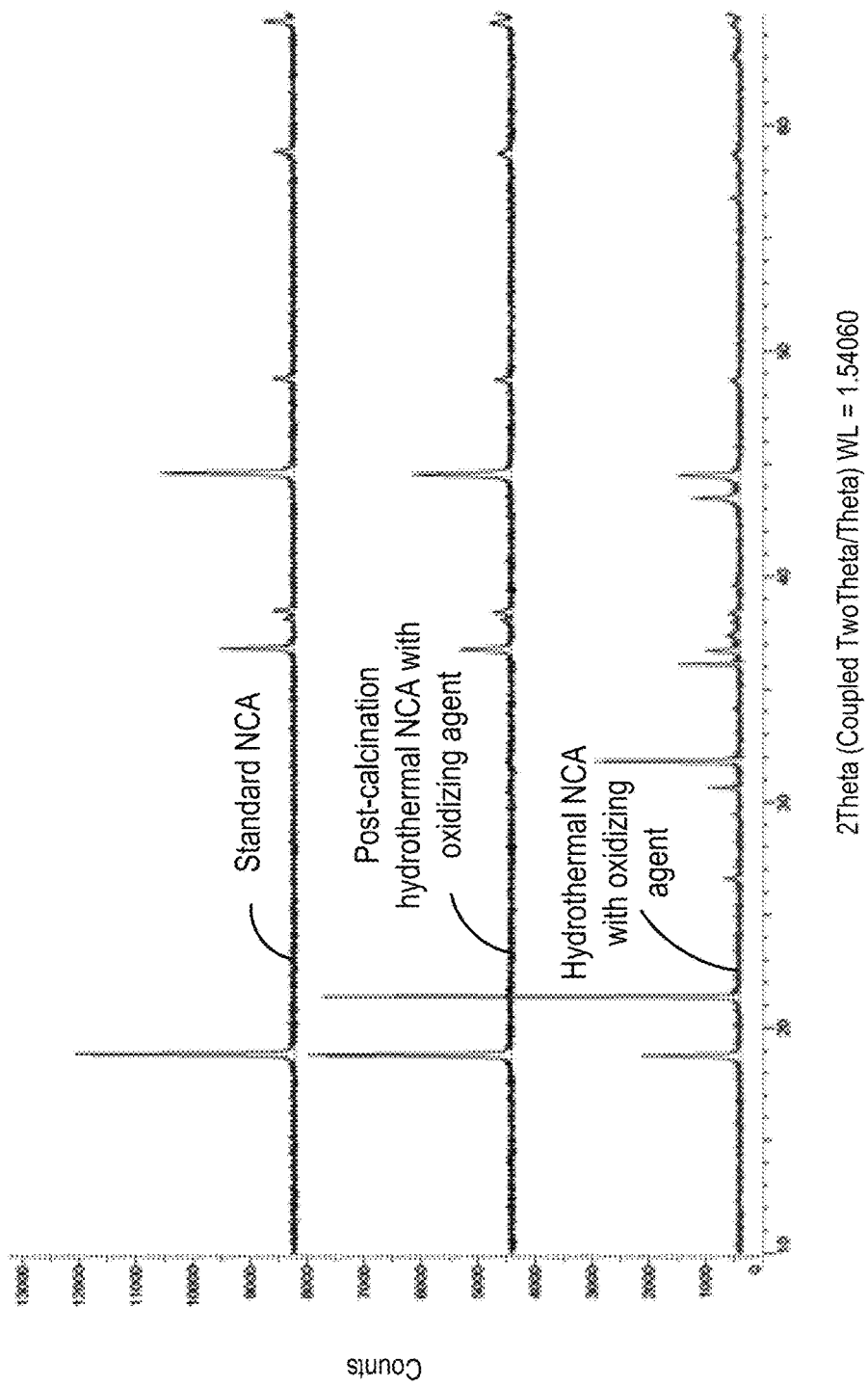
FIG. 4 shows a plot of X-ray powder diffraction patterns for additional example NCA electrode materials.

FIG. 4 shows another plot of X-ray powder diffraction patterns comparing a different batch of example NCA electrode materials also including a standard NCA, a recycled NCA hydrothermally treated with an oxidizing agent, and a recycled NCA hydrothermally treated with an oxidizing agent and also calcined afterward. The above described hydrothermal process was used, again with hydrogen peroxide as the oxidizing agent. The hydrothermal treatment of harvested NCA material resulted in a black colored powder, with the XRD pattern shown at the bottom of the plot of FIG. 4 ("Hydrothermal NCA with oxidizing agent"). Calcination was then performed by placing the NCA material in a crucible and heating under oxygen (1 torr) at 800° C. for nine hours. The resulting material produced the XRD pattern shown in the middle of the plot ("Post-calcination hydrothermal NCA with oxidizing agent"). As shown, the XRD pattern of the calcined material shows more similar diffraction peaks to that of the standard NCA material, compared to the XRD pattern of the hydrothermally treated material without calcination. The results indicate that using a calcination process in addition to hydrothermal treatment with an oxidizing agent may further improve the recovered material. The reflection at two-theta of 21.5 is due to lithium carbonate, which is an intermediate produced in the hydrothermal process.

Figure 5:
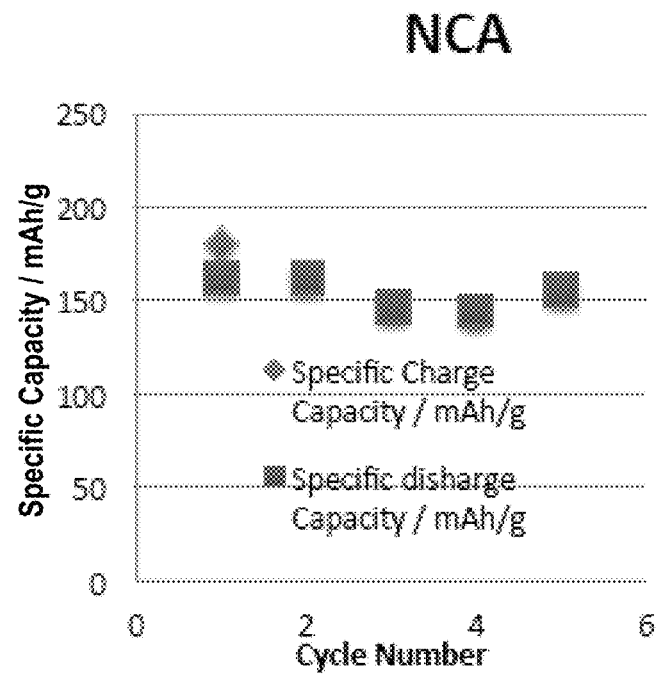
FIG. 5 shows a graph of specific capacity as a function of charge-discharge cycle number for an example untreated NCA standard electrode material.
Figure 6:
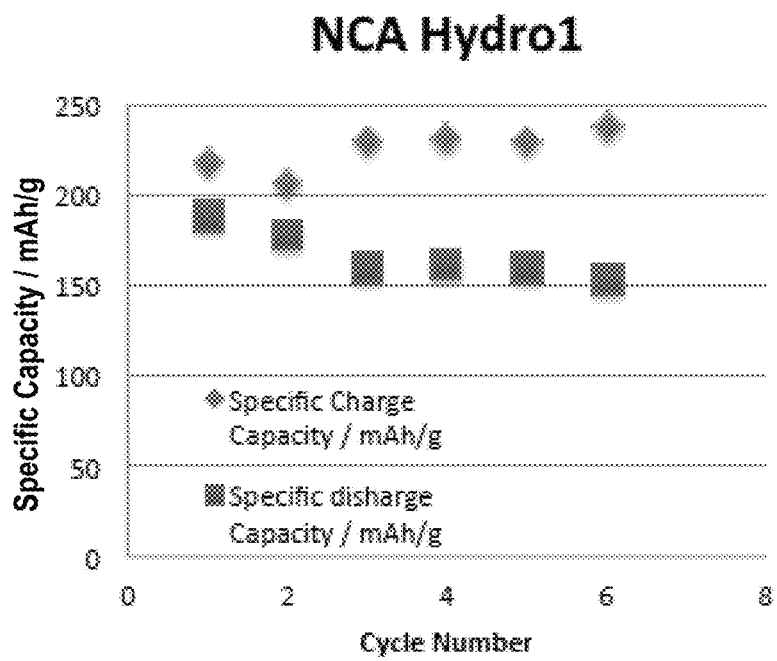
FIG. 6 shows a graph of specific capacity as a function of charge-discharge cycle number for charge-discharge cycles of an example hydrothermally treated recycled NCA electrode material.
Figure 7:
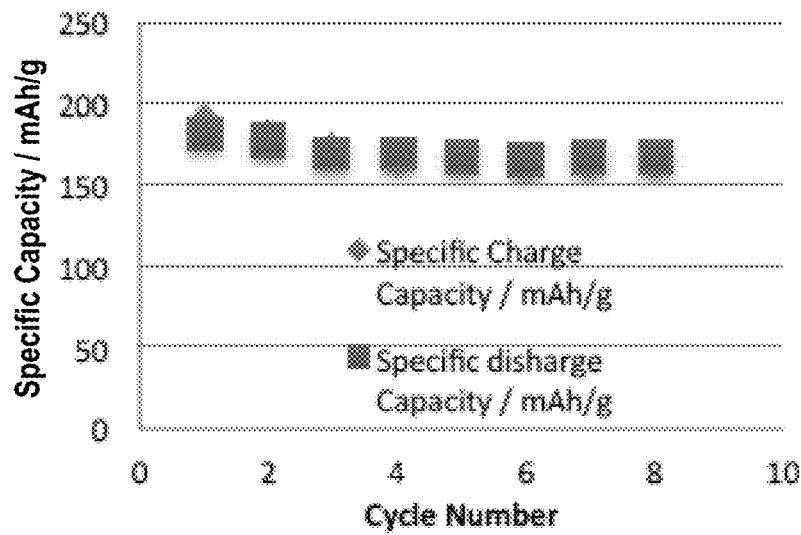
FIG. 7 shows a graph of specific capacity as a function of charge-discharge cycle number for an example hydrothermally treated recycled after washing and drying.

FIG. 5 shows a graph of specific capacity as a function of charge-discharge cycle number for a test cell of an example untreated NCA standard electrode material, and FIG. 6 shows specific capacity as a function of charge-discharge cycle number for test cell of an example oxidative hydrothermally treated NCA electrode material. Results show that the treated cell maintains higher capacity over time and use, although it may reduce efficiency (lower discharge-to-charge ratios). FIG. 7 shows specific capacity as a function of charge-discharge cycle number for a test cell of a NCA material after washing with deionized water and vacuum drying afterwards. The plot of FIG. 6 shows higher capacity and efficiency for the washed NCA material.

Figure 8:
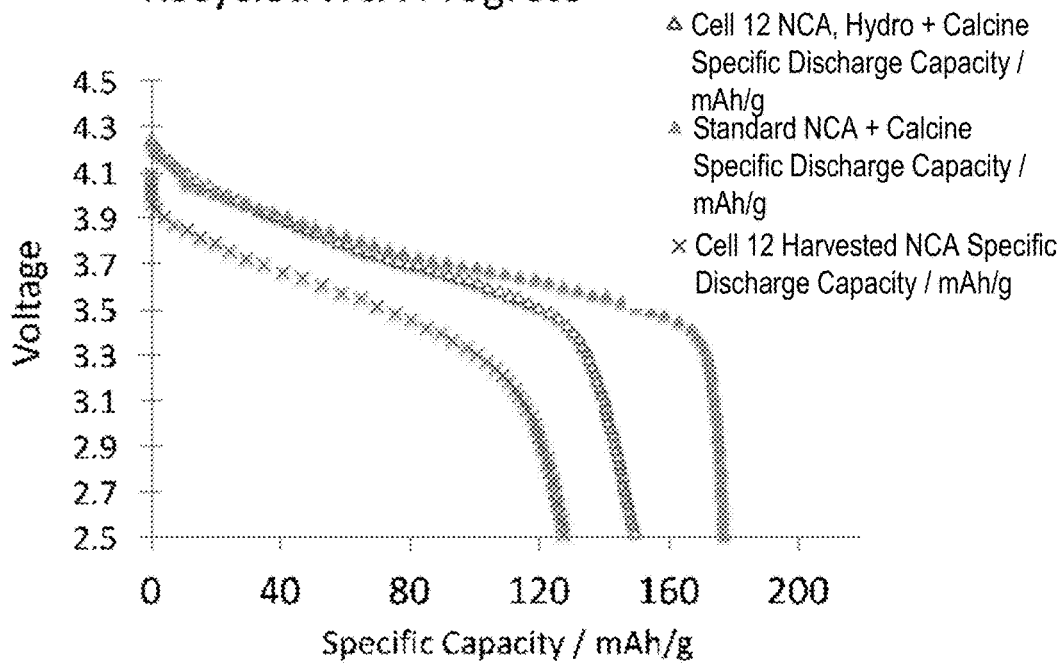
FIG. 8 shows specific discharge capacities of example NCA electrode materials.

FIG. 8 shows specific discharge capacities of example NCA electrode materials, showing a sample NCA material harvested from a cell and the NCA material after oxidative hydrothermal treatment and calcination in comparison to a standard NCA material after calcination. The plot of FIG. 8 shows that the discharge capacity of the harvested NCA material is less than that of the recycled treated material, indicating that the oxidative hydrothermal treatment followed by calcination treatment may improve the capacity of recycled NCA materials.

Figure 9:
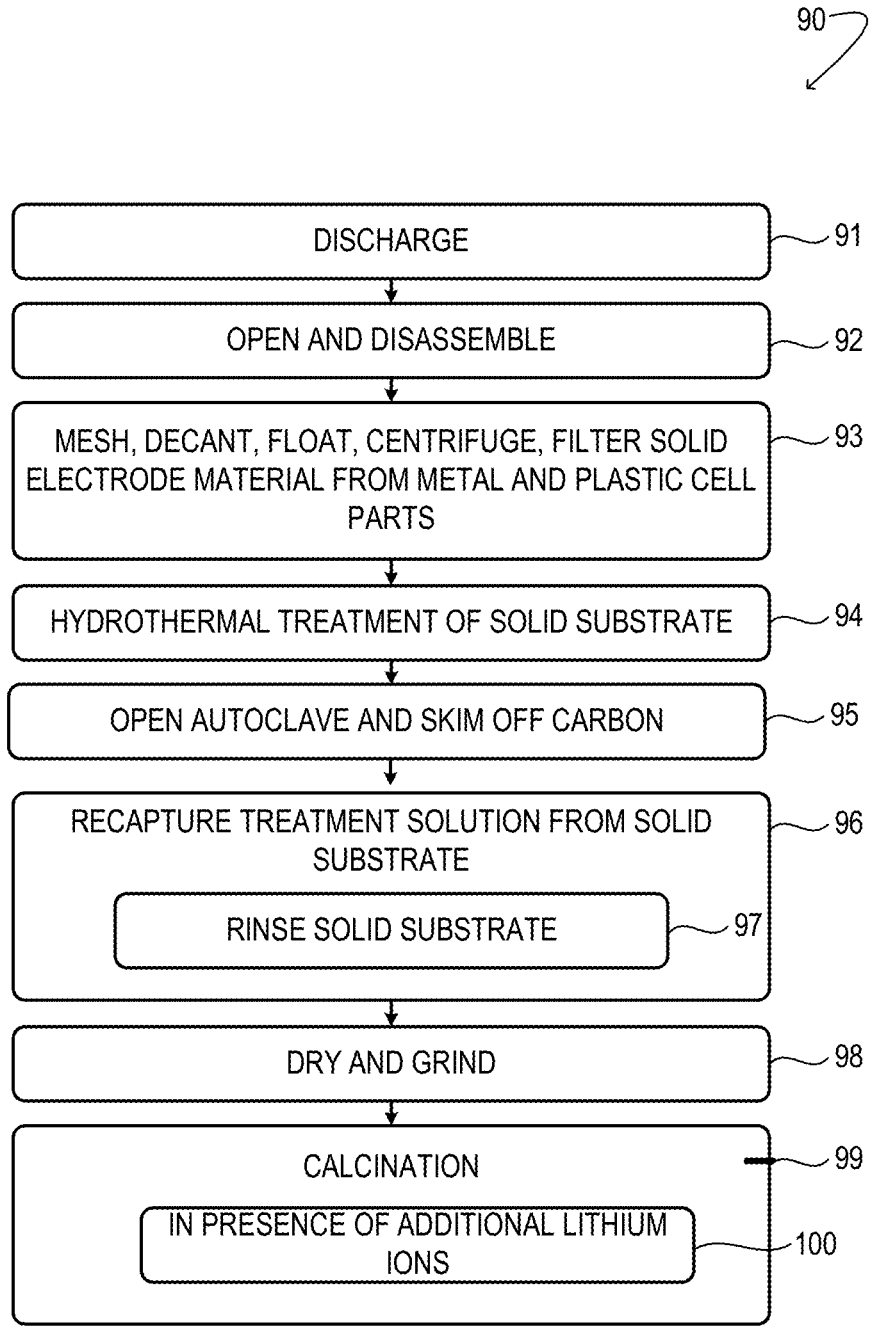
FIG. 9 shows another example method of recycling previously used positive-electrode material of a lithium-ion battery.

FIG. 9 shows another example method 90 of recycling previously used positive-electrode material of a lithium-ion battery. Method 90 includes, at 91, discharging the battery to a nominal voltage (i.e. less than 0.1) or short circuit. This may be accomplished through resistors, solution, or solution with a discharge shuttle. At 92, the cell is opened through physical means such as slitting, shredding, use of a blender, high-pressure fluid cutting, or disassembly through manual or machine-operated methods. The disassembly may occur along with a high pH solution or organic solvent, it may also occur separately with subsequent transfer of material into the solvent/solution. Examples of solvents include n-methyl pyrolidone, di-chloromethane, alcohols (methanol, ethanol, t-butyl alcohol, isopropyl alcohol); solutions are basic using lithium hydroxide or other pH increasing moieties along with soaps or other emulsifiers. During the thrashing portion of the disassembly process, a significant fraction of carbon material floats in the mixture and may be removed through skimming.

Method 90 includes, at 93, using a mesh, decanting, centrifuging or filtering to separate the solid electrode materials from the cell parts. The solid electrode material may be purely positive electrode material (lithium metal oxide) or mixed with negative electrode materials such as carbon or silicon. The collected solid mixture is commonly referred to as "black mass" in the recycling industry, but referred to as harvested material herein. Harvested material may be dewatered to a solid sludge, or dried to a powder. At 94, the harvested material is placed into an autoclave for hydrothermal treatment. An example is 2 g of harvested material, 75 mL of 4M or greater LiOH solution (e.g. 90 g solution/75 mL) and an oxidizing agent, e.g. 2-4 mL of $H_2O_2$. Other suitable oxidizing agents include $LiClO_4$ and those listed above. The mixture is then sealed and heated to 250° C. over two hours, and allowed to naturally cool to room temperature. The total process time may range from 3-4 hours in some examples.

Next, at 95, the autoclave is opened, and any floating carbon rich material is skimmed off. The autoclave decomposes binders, which release intimate mixtures of carbon and lithium metal oxide. The carbon remains suspended or floating shortly after reaction (i.e. 15 min in some examples). At 96, the autoclave reaction solution is recaptured for reuse in subsequent reactions. The solution may have an apple-green hue after treatment with a nickel containing electrode, which is due to $Ni^{2+}$ ions in solution. Reuse of the solution from step 94 produces the same, positive results for recycling electrode materials. Solution reuse has been tested 12 times with different electrode materials with similar positive results. Note that reuse may include addition of LiOH to reach a density of 90 g solution/ 75 mL along with addition of the oxidizing agent. Added LiOH is consumed in relithiation, or diluted in the rinse. Recapturing the autoclave solution may include, at 97, rinsing the treated electrode material with a basic pH solution. During or after the rinse, dense liquids may be used to further separate carbons from the lithium metal oxides because the binders have been removed from the electrode mixture.

The product may be dried at 98, prior to calcination, or in the process of calcination through an evaporative step. At 99, the product may be heated, sintered, or calcined at, for example, temperatures from 300° C. to 1000° C. to reorder the crystal lattice of the lithium metal oxide and vaporize any remaining organic materials. The process optionally may include an oxygen rich atmosphere. Examples disclosed herein were heated to 940° C. for the nickel rich layered metal oxides, and 300° C. for lithium cobalt oxide (nickel-dilute layered metal oxides). Further, as shown at 100, an additional quantity of a lithium ion source, such as lithium carbonate, lithium hydroxide, lithium oxide, and/or lithium acetate, as examples, may be added to further help reintroduce lithium into the metal oxide lattice. It has been found that the addition of lithium carbonate to the sample during calcination may result in increased capacity of the end product, as described in more detail below. Performing the calcination with additional lithium ions after the hydrothermal treatment (hydrothermal treatment may remove substantially all binder from the material) may avoid problems posed by binder materials in the calcination, as binders can decompose and form LiF with the lithium ions present, which may result in less reintercalation of Li ions into the metal oxide lattice.

In an example experiment utilizing the process of FIG. 9 to hydrothermally treat NCA electrode material, the treated electrode materials were then constructed into electrodes with carbon black, and binder (polyvinylidene di-fluoride, PVDF). An example electrode mixture may include 92% active electrode material, 4% binder, and 4% carbon black. The test electrode was made using a press pellet and typically has a mass of 15 mg. These electrodes were sealed into button cells against lithium electrodes with a commercial lithium-ion electrolyte. The testing was accomplished on Maccor or Arbin cycling instruments using current densities between 0.1-2.5 mA/cm$^2$, and is herein referred to as C-rate in which 0.05-1 C is 20 hours-1 hour for discharge. Standard electrode materials were used to compare the recycled electrode materials.

Figure 10:
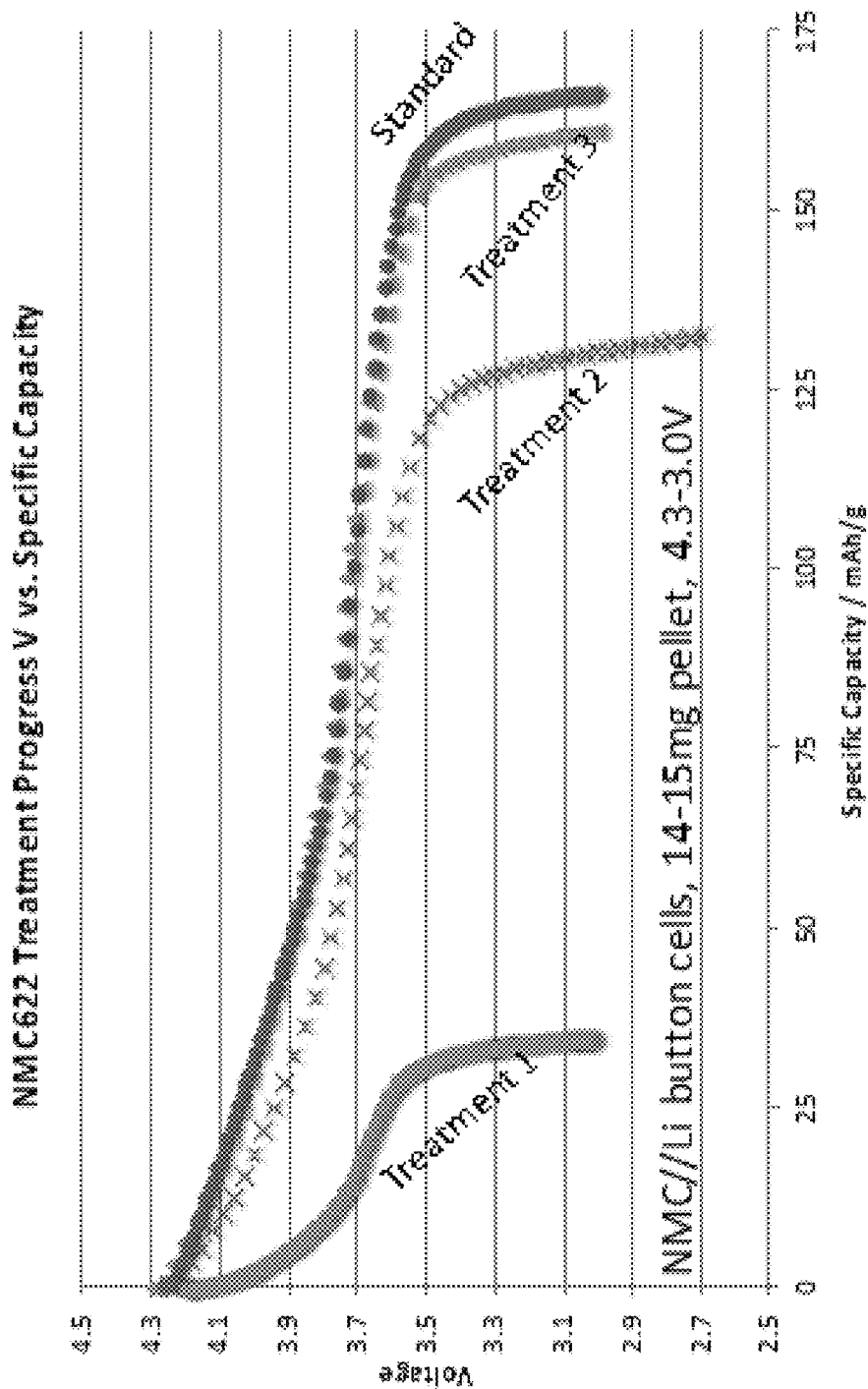
FIG. 10 shows a plot of voltage vs. specific capacity for the initial charge-discharge cycle for example oxidative hydrothermally treated NMC 622 electrode materials compared to an untreated standard electrode material.

FIG. 10 shows a plot of voltage vs. specific capacity for the initial charge-discharge cycle for example oxidative hydrothermally treated NMC 622 electrode materials compared to an untreated standard electrode material. Table 1 shows the autoclave conditions used for each treatment shown. The NMC 622 cells were faded to 80% of their original capacity and processed. The use of oxidizing agents in the autoclave is shown to return high-specific capacity to spent electrodes. Hydrogen peroxide may be a suitably effective agent, due to the reduction step that occurs in order to liberate oxygen. Hydrogen peroxide may be assisting the reintroduction of lithium into metal oxide structures (a reducing step). The oxidizing agent may be stabilizing Ni$^{3+}$ states in the solid (as described above).

Figure 11:
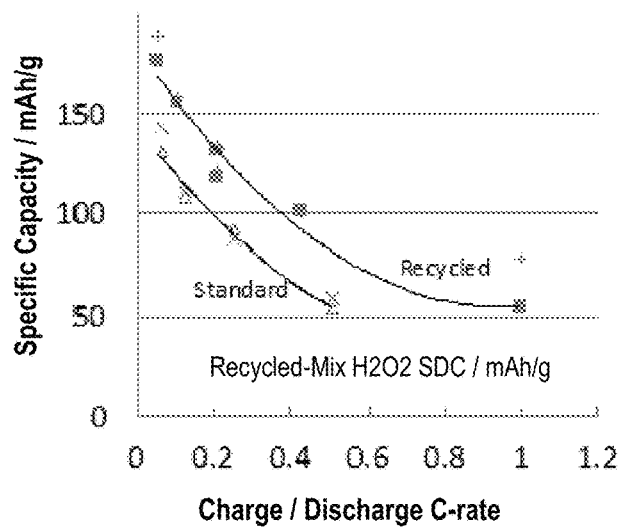
FIG. 11 shows a plot of specific capacity of the first charge-discharge cycle for example oxidative hydrothermally treated NMC 622 electrode materials compared to an untreated standard electrode material.

FIG. 11 shows a plot of specific capacity of the first charge-discharge cycle for example oxidative hydrothermally treated NMC 622 electrode materials compared to an untreated standard electrode material. FIG. 11 shows that recycled NMC 622 produced with oxidizing agents were able to demonstrate improved rate capability and higher specific capacity over standard materials.

TABLE 1

Autoclave conditions for Treatments 1, 2 and 3 in FIG. 10

| | Autoclave condition |
|---|---|
| Treatment 1 | LiOH autoclave (all other steps are equal) |
| Treatment 2 | LiOH autoclave with LiClO$_4$ (1 gram) |
| Treatment 3 | LiOH autoclave with H$_2$O$_2$ |

Table 2 summarizes specific capacities as a function of lithium-ion chemistry, harvest method, and autoclave process. The dark portions of the table are for organic solution harvesting and the light portions are for aqueous. The Li-ion chemistries represent layered metal oxides with increasing nickel content. The use of oxidizing agents may improve recycling of nickel rich NMCs and NCA materials. Table 2 is limited to layered materials. The names of the NMC samples reflect the stoichiometries of the samples; e.g. NMC (111)_comprises nickel, manganese and cobalt in 1:1:1 proportions.

TABLE 2

Summary of capacity for layered metal oxide electrodes and process conditions.

| Chemistry | State of Health | Harvest Solvent | Harvested Material Specific Capacity mAh/g | Hydro-thermal Processed Material mAh/g | Oxidizer & Hydro-thermal Processed Material mAh/g |
|---|---|---|---|---|---|
| LCO | Standard | NMP | 140 | 140-150 | 140-150 |
| | Scrap Material | N/A | — | — | — |
| | New Cell | NMP | 90-100 | 140-150 | 140-150 |
| | Used Cell >20% loss | NMP | 60-90 | 140-150 | 140-150 |
| LCO | Standard | Deionized water | 140 | 140-150 | 140-150 |
| | Scrap Material | N/A | — | — | — |
| | New Cell | Deionized water | 90-100 | 140-150 | 140-150 |
| | Used Cell >20% loss | Deionized water | 60-90 | 140-150 | 140-150 |
| LCO/Titania | Standard | N/A | 150 est | — | — |
| | Scrap Material | N/A | — | — | — |
| | New Cell | NMP | 90-100 | 140-150 | 140-150 |
| | Used Cell >20% loss | NMP | 60-90 | 140-150 | 140-150 |
| LCO/Titania | Standard | N/A | 150 est | N/A | — |
| | Scrap Material | N/A | — | — | — |
| | New Cell | Basic solution | 90-100 | 140-150 | 140-150 |
| | Used Cell >20% loss | Basic solution | 60-90 | 140-150 | 140-150 |
| NMC 111 | Standard | NMP | 150 | 150 | 150 |
| | Scrap Material | — | — | — | — |
| | New Cell | — | — | — | — |
| | Used Cell >20% loss | — | — | — | — |
| NMC 111 | Standard | Basic solution | 150 | 150 | 150 |
| | Scrap Material | — | — | — | — |
| | New Cell | — | — | — | — |
| | Used Cell >20% loss | — | — | — | — |
| NMC 523 | Standard | NMP | 155 | 155 | 155 |
| | Scrap Material | NMP | 155 | 155 | 155 |
| | New Cell | NMP | 120 | 155 | 155 |
| | Used Cell >20% loss | NMP | 80-90 | 153 | 153 |
| NMC 523 | Standard | Basic solution | 155 | 155 | 155 |
| | Scrap Material | Basic solution | 155 | 155 | 155 |
| | New Cell | Basic solution | 120 | 155 | 155 |
| | Used Cell >20% loss | Basic solution | 80-90 | 153 | 153 |
| NMC 622 | Standard | NMP | 160 | 160 | 160 |
| | Scrap Material | NMP | 160 | 160 | 160 |
| | New Cell | NMP | — | — | — |
| | Used Cell >20% loss | NMP | 20-40 | 40 | 160 |

TABLE 2-continued

Summary of capacity for layered metal oxide electrodes and process conditions.

| Chemistry | State of Health | Harvest Solvent | Harvested Material Specific Capacity mAh/g | Hydro-thermal Processed Material mAh/g | Oxidizer & Hydro-thermal Processed Material mAh/g |
|---|---|---|---|---|---|
| NMC 622 | Standard | Basic solution | 160 | 160 | 160 |
| | Scrap Material | Basic solution | — | — | — |
| | New Cell | Basic solution | 120 | 160 | 160 |
| | Used Cell >20% loss | Basic solution | 20-40 | 40 | 160 |
| NCA | Standard | NMP | 190 | 190 | 190 |
| | Scrap Material | N/A | — | — | — |
| | New Cell | NMP | 170 | 190 | 190 |
| | Used Cell >20% loss | NMP | 20-40 | 40 | 160 |
| NCA | Standard | Basic solution | 190 | 190 | 190 |
| | Scrap Material | Basic solution | — | — | — |
| | New Cell | Basic solution | 170 | 190 | 190 |
| | Used Cell >20% loss | Basic solution | 20-40 | 40 | 160 |

Figure 12:
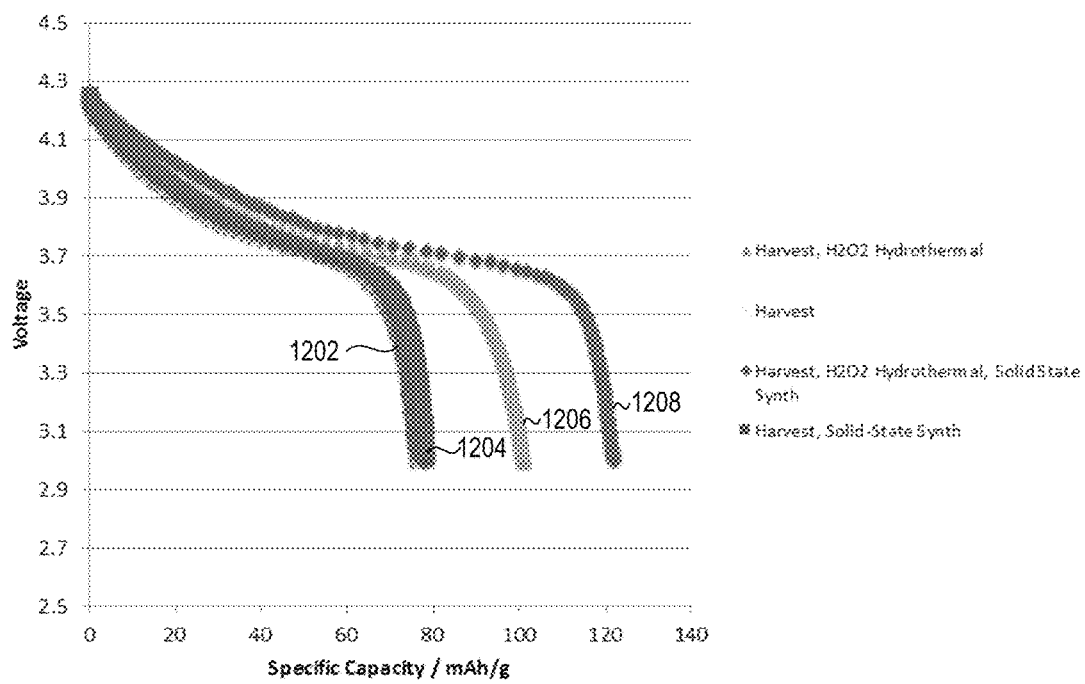
FIG. 12 shows a comparison of specific discharge capacity of recovered mixed electrode and the same electrode with oxidative hydrothermal treatment and solid state addition of lithium according to examples.

FIG. 12 shows a comparison of specific discharge capacity of recovered mixed electrode comprising different types of cathode materials (spinel materials ($LiMn_2O_4$) and lithium nickel cobalt oxide materials), and the same mixed electrode after oxidative hydrothermal treatment. The oxidative treatment described above improved the specific capacity of spent Li-ion electrode mixed materials. For this example, the materials were first harvested and then tested. The specific capacity for the harvested but untreated materials corresponds to the left-most plot 1202 in FIG. 12. Next, some material was removed form the sample and subjected to a solid state calcination in the presence of lithium carbonate. The specific capacity of this sample is shown at 1204. Next, the sample that was not initially calcinated was treated hydrothermally as described above. Some of this hydrothermally treated sample was calcinated without additional lithium ions. The specific capacity of this sample after hydrothermal is shown at 1206. Another of the hydrothermally treated material was calcinated with additional lithium carbonate, added in an amount equivalent to approximately 30 mAh of additional specific capacity. The specific capacity of this sample is shown at 1208. Without wishing to be bound by theory, it is believed that the hydrothermal treatment process removes binder material from the electrode material mixture, and therefore avoids problems with side reactions with fluoride and possibly other species during calcination.

Some of the process steps described and/or illustrated herein may, in some embodiments, be omitted without departing from the scope of this disclosure, and/or additional steps may be used. Likewise, the indicated sequence of the process steps may not always be required to achieve the intended results, but is provided for ease of illustration and description. One or more of the illustrated actions, functions, or operations may be performed repeatedly, depending on the particular strategy being used. It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method of recycling a positive-electrode material of a lithium-ion battery, the method comprising:
relithiating the positive-electrode material by heating the positive-electrode material in a solution comprising lithium ions and an oxidizing agent under pressure in an autoclave; and
after relithiating, separating the positive-electrode material from the solution.

2. The method of claim 1, wherein the solution comprising lithium ions also comprises dissolved nickel.

3. The method of claim 1, wherein relithiating the positive-electrode material comprises relithiating the positive-electrode material via a fluidized bed.

4. The method of claim 1, further comprising, prior to heating the positive-electrode material, removing an amount of carbon from the positive-electrode material.

5. The method of claim 1, further comprising, after heating the positive-electrode material, removing an amount of carbon from the positive-electrode material.

6. The method of claim 1, wherein the oxidizing agent comprises one or more of oxygen, a peroxide, a permanganate, a nitrate, a sulfite, a carbonate, and a phosphate.

7. The method of claim 1, further comprising, after separating the positive-electrode material from the solution, rinsing the positive-electrode material in a basic liquid, and drying the positive-electrode material.

8. The method of claim 7, wherein rinsing the positive-electrode material comprises rinsing with a solution of water and lithium hydroxide.

9. The method of claim 7, wherein rinsing the positive-electrode material includes rinsing with a nonaqueous solvent comprising one or more of methanol, ethanol, isopropol alcohol, t-butanol, n-butanol, glycol, polyethelene glycol, bromoform, di-bromomethane, bromal, tetraboro-methane, bromine, di-bromoethane; solutions of ammonium metatungstate, sodium polytungstate, and potassium tetraiodomercurate(II).

10. The method of claim 7, further comprising calcining the positive-electrode material after drying the positive-electrode material.

11. The method of claim 1, wherein the solution comprises a supersaturated lithium hydroxide solution.

12. A method of recycling a positive-electrode material of a lithium-ion battery, the method comprising:
heating the positive-electrode material in a solution comprising lithium ions and an oxidizing agent under pressure in an autoclave;
after heating, separating the positive-electrode material from the solution; and
after separating, recovering the positive-electrode material.

13. The method of claim 12, further comprising, prior to heating the positive-electrode material, removing an amount of carbon from the positive-electrode material.

14. The method of claim 12, wherein the oxidizing agent comprises one or more of an oxygen, a peroxide, a permanganate, a nitrate, a sulfite, a carbonate, and a phosphate.

15. The method of claim 12, further comprising, after separating the positive-electrode material from the solution, rinsing the positive-electrode material with a solution or buffer of basic pH.

16. The method of claim 15, wherein rinsing the positive-electrode material comprises rinsing with a solution of water and lithium hydroxide.

17. The method of claim 15, wherein rinsing the positive-electrode material includes rinsing with a nonaqueous solvent comprising one or more of methanol, ethanol, isopropol alcohol, t-butanol, n-butanol, glycol, polyethelene glycol, bromoform, di-bromomethane, bromal, tetraboro-methane, bromine, di-bromoethane; solutions of ammonium metatungstate, sodium polytungstate, and potassium tetraiodomercurate(II).

18. The method of claim 12, wherein the solution comprises a supersaturated lithium hydroxide solution.

19. A method of recycling a positive-electrode material of a lithium-ion battery, the method comprising:
    removing an amount of carbon from the positive-electrode material;
    heating the positive-electrode material in a supersaturated lithium hydroxide solution under pressure in an autoclave, the supersaturated lithium hydroxide solution comprising an oxidizing agent;
    after heating, separating the positive-electrode material from the supersaturated lithium hydroxide solution; and
    after separating, recovering the positive-electrode material.

20. The method of claim 19, wherein the oxidizing agent comprises one or more of an oxygen, a peroxide, a permanganate, a nitrate, a sulfite, a carbonate, and a phosphate.

* * * * *